(12) United States Patent
Sundararajan et al.

(10) Patent No.: US 7,426,403 B2
(45) Date of Patent: Sep. 16, 2008

(54) METHODS AND APPARATUS FOR DATA COMMUNICATION FOR MOBILE ELECTRONIC DEVICES

(75) Inventors: Muralidharan Sundararajan, Portland, OR (US); Vinod Balakrishnan, Beaverton, OR (US); John L. Light, Beaverton, OR (US); Trevor A. Pering, Mountain View, CA (US); Roy Want, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 11/046,258

(22) Filed: Jan. 28, 2005

(65) Prior Publication Data

US 2006/0172778 A1 Aug. 3, 2006

(51) Int. Cl.
*H04Q 7/20* (2006.01)

(52) U.S. Cl. .................. 455/566; 455/550.1; 455/41.1; 455/41.2; 455/414.2; 455/414.1; 370/310; 370/313; 709/219; 709/203; 709/202; 709/227; 709/228; 707/1; 707/3; 707/6; 707/8

(58) Field of Classification Search ................ 455/566, 455/550.1, 412.1, 412.2, 456.1, 456.7, 414.1, 455/414.2, 414.3, 414.4, 422.1, 403, 500, 455/502, 418–420, 41.1, 41.2, 41.3, 517, 455/560; 370/310, 313; 709/219, 203, 202, 709/227, 228; 707/1, 3, 6, 8, 10, 100
See application file for complete search history.

(56) References Cited

U.S. PATENT DOCUMENTS

| 2005/0102376 A1* | 5/2005 | Ichikawa | 709/219 |
| 2005/0165795 A1* | 7/2005 | Myka et al. | 707/100 |
| 2005/0192052 A1* | 9/2005 | Tenhunen | 455/557 |

* cited by examiner

*Primary Examiner*—Keith T Ferguson
(74) *Attorney, Agent, or Firm*—Kacvinsky LLC

(57) ABSTRACT

According to one embodiment of the invention, a method for discovering the presence of at least one source and target mobile device, automatically displaying a graphical interface to show the dataset from the source mobile device, and initiating the transmission of data between the mobile devices, is provided. The method further includes automatically receiving the dataset from the source mobile device, where the dataset is at least a representation of the data on the source device. In one embodiment, the representation is a subset of the data on the device and/or a description of the data on the mobile device. In another embodiment, a method for a navigation system to discover the presence of at least one mobile device, to automatically receive data from the mobile device, and to process the data with navigation operations, is provided.

18 Claims, 7 Drawing Sheets

METHODS AND APPARATUS FOR DATA COMMUNICATION FOR MOBILE ELECTRONIC DEVICES

TECHNICAL FIELD

One embodiment generally relates to the communication of data and, more specifically, to a method and apparatus for data communication for mobile electronic devices.

BACKGROUND

Recently, compact and mobile electronic devices such as Personal Digital Assistants (PDA), cellular phones, portable computers, or the like, have become essential for mobile communication, personal data organization, and portable data processing. These mobile devices include the capability to manage, receive, store, process and display personal information such as contact names, phone numbers, appointments, pictures, addresses, preferences, and the like.

A current trend in the communications industry is to equip mobile electronic devices with a wireless communication interface to communicate in an automated fashion with other devices within its communication range. Typically, technologies such as Bluetooth IEEE 802.15, IEEE 802.11a, IEEE 802.11b, or the like are used. To facilitate universal communication between these devices, universal communication network connectivity mechanisms have been developed such as Universal Plug and Play (UPnP). UPnP provides an industry standard architecture for pervasive peer-to-peer network connectivity of electronic devices to allow seamless proximity networking. Data may thus be communicated or exchanged between different devices in a flexible manner.

Graphical User Interfaces (GUI) are popular with end users for their ease of use. GUIs are now a necessary element for mobile electronic devices such as PDAs and cellular phones. However, the restricted display monitor size for these compact mobile devices effectively limits the ability of multiple users to share in the experience of viewing and manipulating data from a single mobile electronic device. An additional problem with the current usage model of mobile electronic devices is the difficulty associated with merging the contents of multiple mobile devices on a single display monitor. Yet another problem is the difficulty associated with the transmission of data among multiple mobile devices. Computationally constrained devices cannot easily perform large data transmissions.

Moreover, Global Positioning System (GPS) navigation devices are frequently used in automobiles to collect and display position information. When installed in a vehicle, a GPS receiver can determine a car's position by using the data supplied by satellites, and can provide other useful information. The driver can enter a destination location and the navigation system will calculate the optimal route, distance to destination, and other pertinent information. However, it is often cumbersome and time-consuming to manually enter destinations using the on-screen menus of the navigation system monitor.

BRIEF DESCRIPTION OF THE DRAWINGS

In the drawings, like reference numerals refer to like parts throughout the various views of the non-limiting and non-exhaustive embodiments of the present invention, and wherein.

DETAILED DESCRIPTION

In the following description, numerous specific details are provided, such as the identification of various system components, to provide a thorough understanding of embodiments of the invention. One skilled in the art will recognize, however, that the embodiments of the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Data Communication Among Multiple Devices

Figure 1:
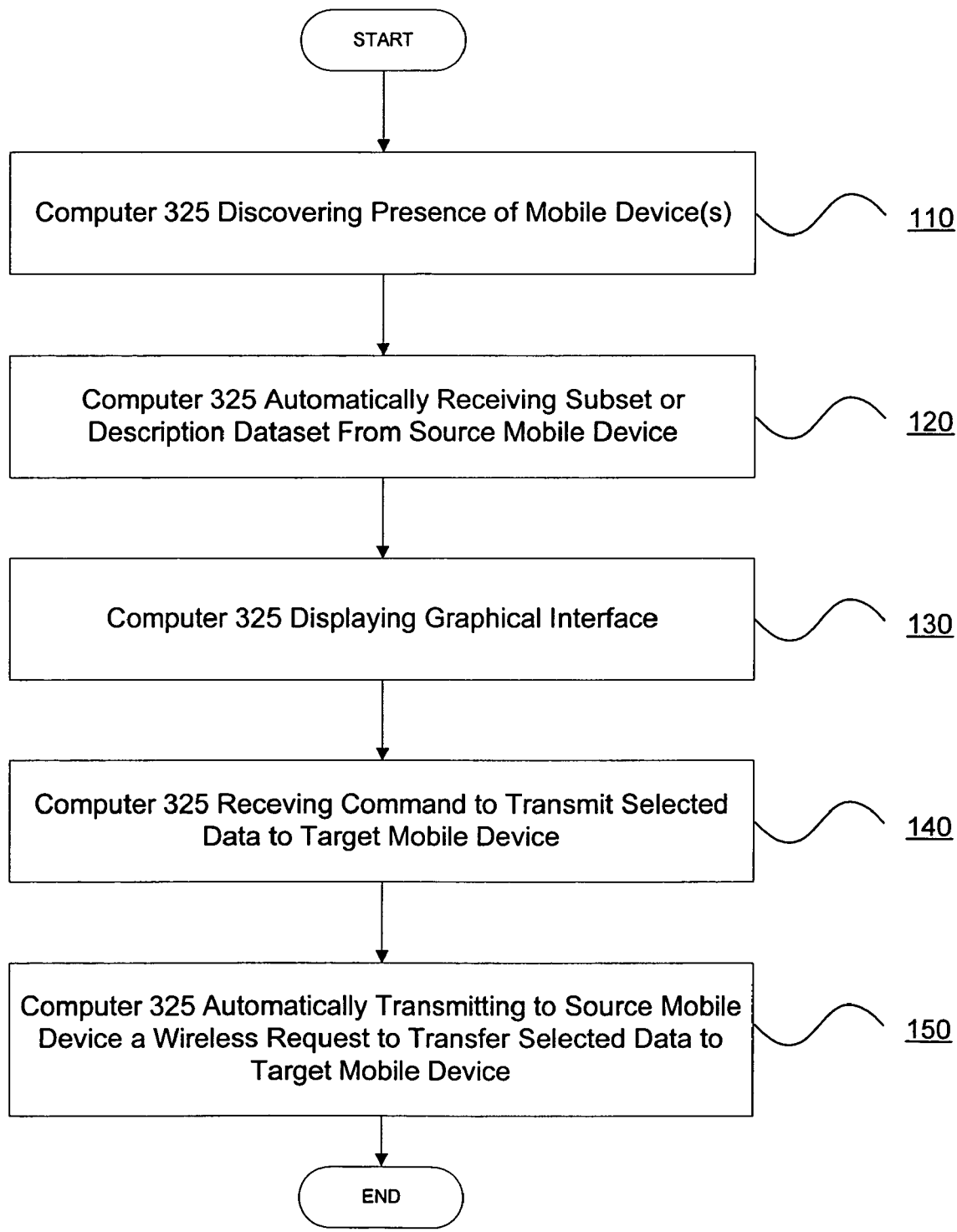
FIG. 1 is a flow diagram describing the process of one embodiment of the present invention for data communication among multiple mobile devices facilitated by a computer.

FIG. 1 is a flow diagram describing the process of one embodiment of the present invention for data communication among multiple mobile devices facilitated by a computer. The processes of the flow diagram in FIG. 1 are described with reference to the block diagrams of FIGS. 3(a)-3(c).

Figure 3A:
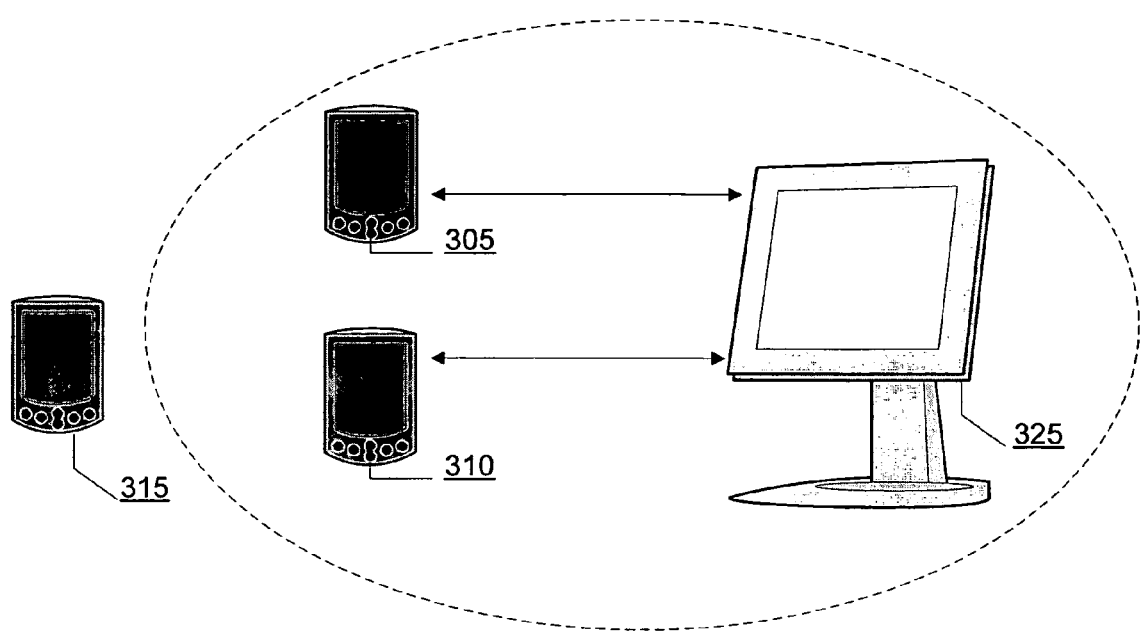
FIGS. 3(a)-(d) are block diagrams illustrating one embodiment of the present invention for data communication among multiple mobile devices.

In block 110, a computer may discover the presence of one or more mobile devices. In FIG. 3(a), illustrating one embodiment, the computer 325 monitors an area within a predetermined distance by periodically transmitting a communication signal to facilitate device discovery. The computer 325 discovers the presence of the mobile devices 305 and 310 when the devices 305 and 310 are within a predetermined proximity to the computer 325.

Accordingly, a wireless connection is established between mobile devices 305 and 310 and the computer 325. In one embodiment, communication between the mobile devices 305 and 310 and the computer system 325 maybe based upon standard network or internet protocols, such as Universal Plug and Play (UPnP), Simple Object Access Protocol (SOAP), Transmission Control Protocol/Internet Protocol (TCP/IP), and Hyper Text Transfer Protocol (HTTP).

The mobile devices 305-315 may be a personal server, PDA, cell phone, portable computer, databank watch, or the like. The mobile devices include a wireless communication interface, such as a BLUETOOTH™ transceiver. Alternatively, the communication interface may comprise another type of RF transceiver such as wireless fidelity (Wi-Fi) 802.11.

The computer system 325 may be a public use computer, kiosk, a personal computer (PC), or the like. The computer system 325 may include a processor, storage area, discovery module, network interface, display module, input device(s), and an inter-device communication module. The network interface of the computer 325 may include a wireless communication interface, such as a BLUETOOTH™ transceiver, for communicating with the wireless interface of the mobile devices. Alternatively, the network interface may comprise another type of RF transceiver such as wireless fidelity (Wi-Fi) 802.11. The discovery module, coupled to the network interface, performs the function(s) of block 110.

In one embodiment, the computer 325 may receive a dataset from the mobile device(s) in three forms. In one embodiment, the received dataset is a complete representation of the corresponding data on the mobile device. The data on a mobile device may include one or more data files, such as a document, picture image, sound or video file, or the like. A complete representation dataset may include the data file(s) (i.e., a document, picture image, etc.). In another embodiment, the computer 325 receives a complete representation dataset through a byte stream protocol, such as Transmission Control Protocol (TCP).

In a second embodiment, the computer may receive a subset of the corresponding data on the mobile device, such as a thumbnail image or the like. In a third embodiment, the computer receives a description of the corresponding data on the mobile device, such as a filename or the like. In one embodiment, a single dataset may take one or more of the preceding forms.

In block 120 of FIG. 1, after communication is established, in one embodiment, the computer 325 receives a subset and/or a description of the corresponding data from one or more source mobile devices 305 and 310. For example, referring to FIG. 3(b), the received dataset 350 may include data file 350(A), a low-resolution thumbnail image. The data file 350 (A) may correspond to a high-resolution picture image stored on the source device 305. Accordingly, the data of the source mobile device does not flow through the computer 325.

In one embodiment, the dataset may be transmitted automatically from the mobile device without manipulation of the source mobile device and/or target mobile device. Alternatively, the dataset is received at the direction of a user of one of the mobile devices. In one embodiment, the received dataset 350 is stored on the computer storage area.

In block 130, the computer 325 displays a graphical interface for one or more discovered mobile devices. In one embodiment, a separate graphical interface for each discovered mobile device is provided. The graphical interface identifies the dataset and its component data file(s) received from one mobile device. Alternatively, a single graphical interface may be provided for two or more discovered mobile devices. For example, the computer may merge the datasets received from multiple mobile devices such that a single graphical interface identifies the datasets of more than one source mobile device. In one embodiment, the computer display facilitates viewing by multiple users. In one embodiment, the display module performs the function(s) of block 130.

Figure 3B:
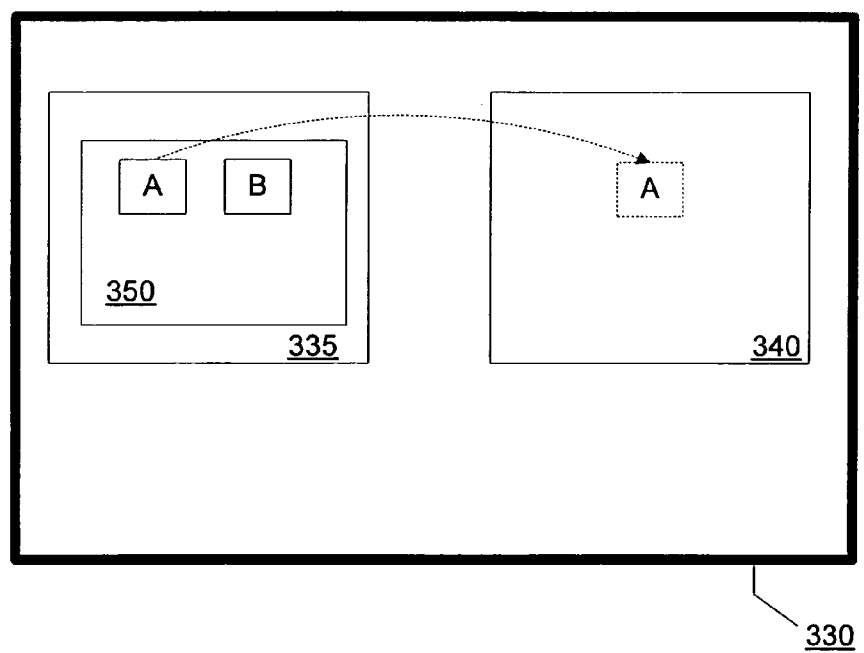

As illustrated in FIG. 3(b), a separate graphical interface for each discovered source mobile device may show the received datasets in a summarized format. A source device may be one of mobile devices 305 or 310. The computer 325 displays on the computer screen 330 graphical interfaces 335 and 340 for the discovered mobile devices 305 and 310, respectively. The graphical interface 335 identifies the dataset 350 received from the source mobile device 305. The graphical interface 340 identifies the dataset received from the source mobile device 310. As illustrated in FIG. 3(b), a dataset was not received from mobile device 310.

In one embodiment, a user or users may select and manipulate one or more datasets, such as dataset 350, or portion thereof, depicted on one or more of the graphical interfaces by using a drag-and-drop methodology, or other similar method of data manipulation. For example, a user may select the received data file 350(A) of graphical interface 335, as illustrated in FIG. 3(b), and drag-and-drop the icon into target graphical interface 340. Accordingly, the data manipulation paradigm facilitates the data corresponding to the selected data to be moved or copied to the target mobile device. In one embodiment, the selected data may include one or more data files.

At block 140 of FIG. 1, the computer 325 receives a command to transmit (i.e., move or copy) the selected data to one or more target mobile devices corresponding to the target graphical interface(s). In one embodiment, the command is entered on the respective mobile device and transmitted to the computer. Alternatively, the command is entered via an input device of the computer 325. For example, the computer 325 may receive a command, via an operation performed on the computer screen 330, to transmit data file 350(A) to the target mobile device 310 corresponding to target graphical interface 340. The command may include multiple target mobile devices. The input devices may further include an alphanumeric input device and a cursor control, such as a mouse, trackball, track pad, stylus, or cursor direction keys, for communicating a command to transmit.

Figure 3C:
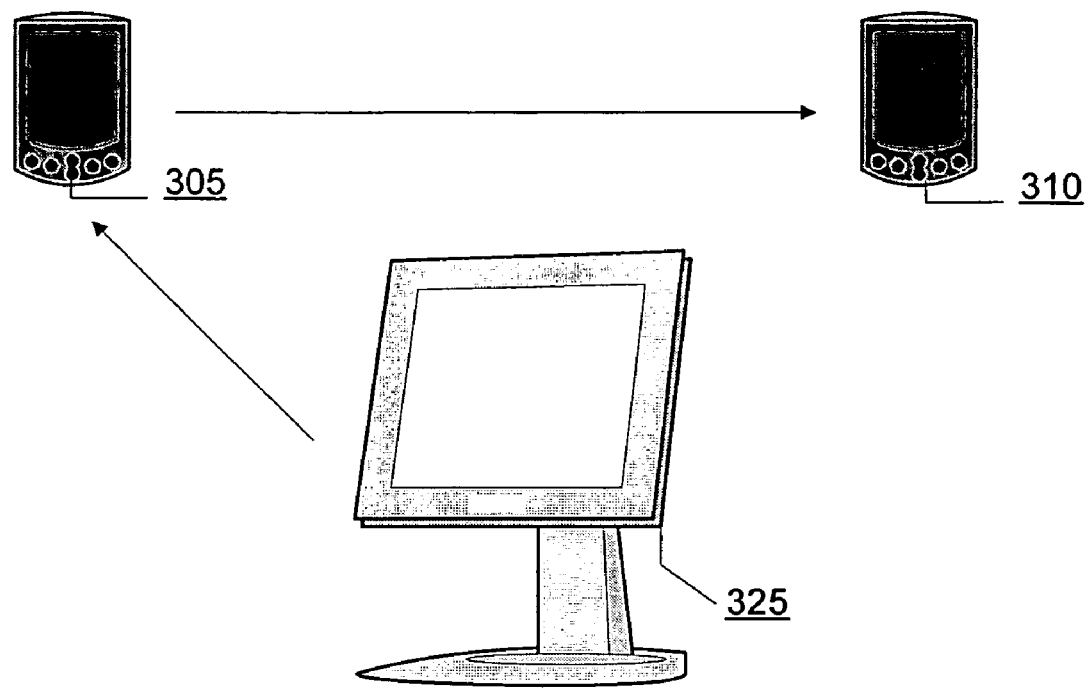

At block 150, the computer may automatically send a wireless request to the source mobile device to transmit the data corresponding to the selected data to the target mobile device(s), without manipulation of the source mobile device and/or target mobile device. In one embodiment, block 150 is performed by an inter-device communication module. Referring to FIG. 3(c), the computer 325 automatically sends a request to the source device 305 to transmit the data, for example a high-resolution picture image, corresponding to the selected data file 350(A), a thumbnail image, to the target device 310. Source device 305 transmits the data, the high-resolution picture image, to target device 310. Accordingly, the data of the source device 305 does not flow through the computer 325.

In one embodiment, the computer 325 removes the received dataset 350 when the respective mobile device is no longer in wireless communication with the computer. The computer 325 may detect an absence of a mobile device, as would occur when the mobile device is no longer within the predetermined distance for wireless communication. For example, the computer 325 may poll for the mobile devices 305 and 310. The computer 325 may fail to receive a communication signal from a mobile device for a period of time. In another embodiment, an end of a user session signals that a mobile device is no longer in wireless communication. In response, the computer 325 may remove the data received from the mobile device no longer in wireless communication with the computer 325. In one embodiment, the removal of data may occur automatically.

Figure 2:
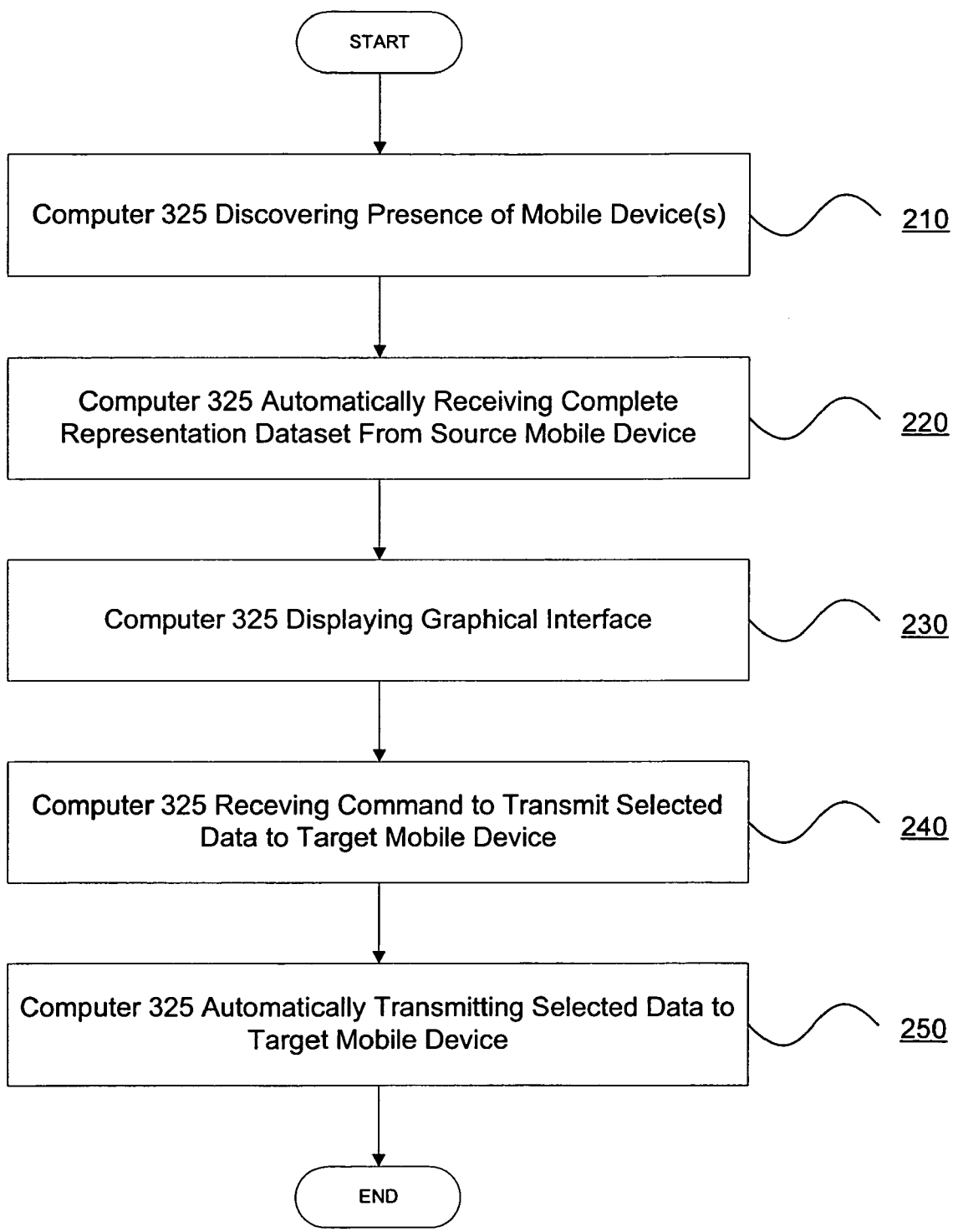
FIG. 2 is a flow diagram describing the process of one embodiment of the present invention for data communication among multiple mobile devices.

FIG. 2 is a flow diagram describing the process of one embodiment of the present invention for data communication among multiple mobile devices. The processes of the flow diagram in FIG. 2 are described with reference to the block diagrams of FIGS. 3(b) and 3(d). In block 210, the computer 325 discovers the presence of one or more mobile devices 305 and 310.

In block 220, the computer receives a complete representation dataset of the corresponding data from one or more of the mobile devices. For example, the received data file 350(B) of FIG. 3(b) may be a streaming message or a file stored on the source device 305.

As described in block 230 of FIG. 2, the computer displays a graphical interface. At block 240, the computer receives a command to transmit a selected data. Referring to FIG. 3(b), a user may select data file 350(B) to transmit to a target device 310.

Figure 3D:
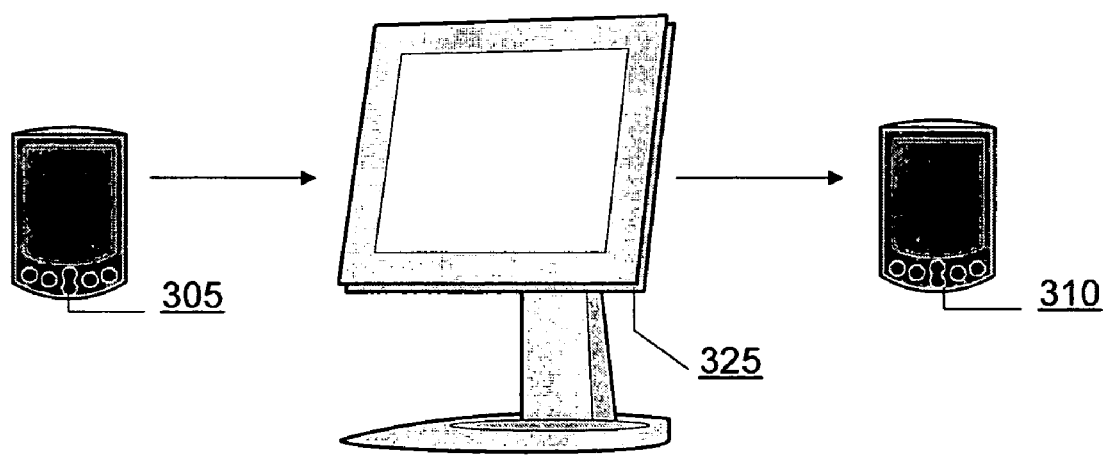

In one embodiment in block 250, the computer 325 transmits, over a wireless link, the selected data to one or more target mobile devices. In one embodiment, block 250 is performed by an inter-device communication module. Referring to FIG. 3(d), the computer 325 transmits the selected data file 350(B), received from source device 305, to the target device 310. In one embodiment, transmitting the data from the computer to the target is performed automatically, without the user's manipulation of the source mobile device and/or target mobile device. In one embodiment, the computer 325 may remove the received dataset 350 from the computer storage area.

Data Communication with a Navigation System

Figure 4:
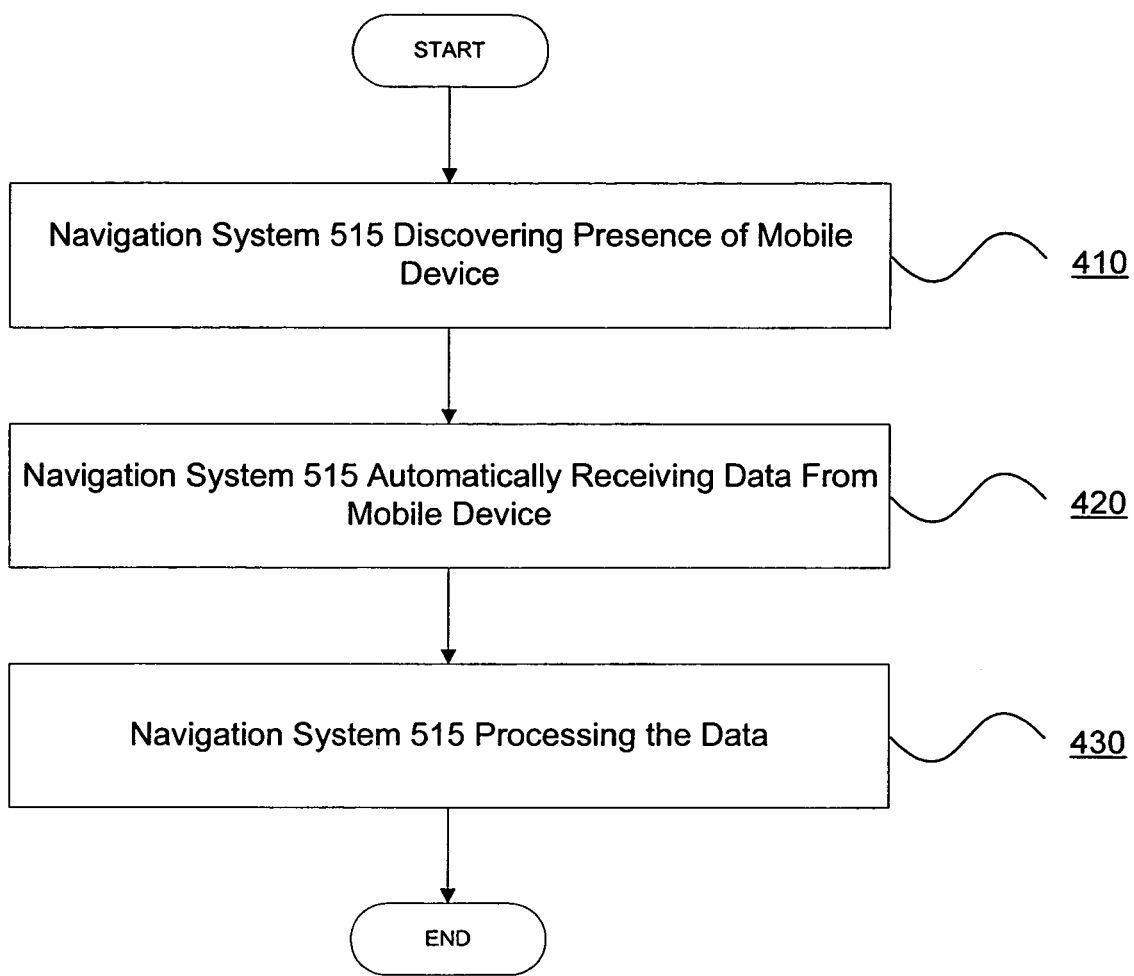
FIG. 4 is a flow diagram describing the flow of events of one embodiment of the present invention for use with a wireless navigation system.

FIG. 4 is a flow diagram describing the flow of events of one embodiment of the present invention for use with a wireless navigation system.

Figure 5A:
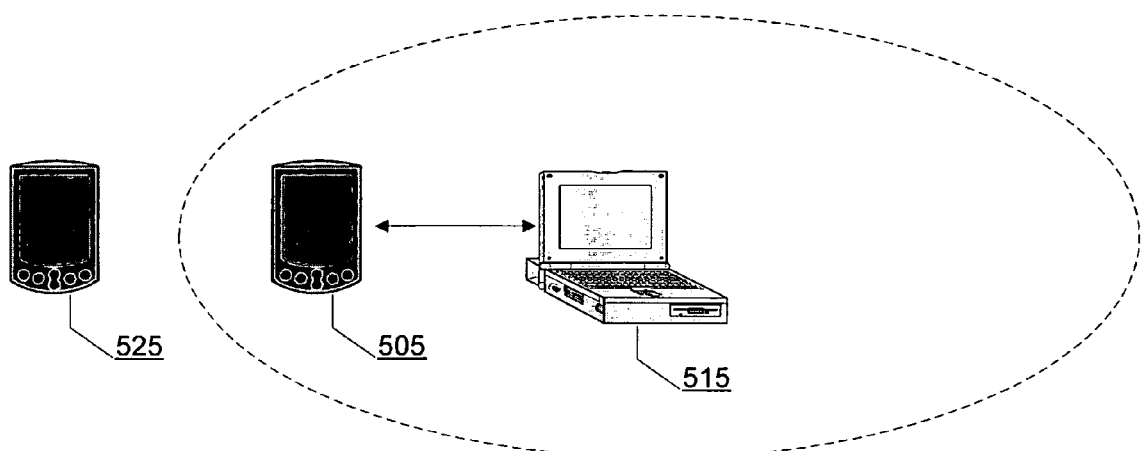
FIGS. 5(a)-(c) are block diagrams illustrating one embodiment of the present invention for use with a wireless navigation system.

In block 410 of FIG. 4, a navigation system discovers the presence of one or more mobile devices. In one embodiment as illustrated in FIG. 5(a), the navigation system 515 monitors an area within a predetermined distance by periodically transmitting a communication signal to facilitate device discovery. In one embodiment, the navigation system 515 is contained within an automobile. The navigation system 515 discovers the presence of the mobile device 505 when the device is within the predetermined proximity to the navigation system 515, as may occur when a user carrying the mobile device 505 enters the cabin of the automobile. Mobile device 525 is not within the predetermined distance thus, is not discovered.

Accordingly, a wireless connection is established between mobile device 505 and the navigation system 515. In one embodiment, communication between the mobile device 505 and navigation system 515 maybe based upon standard network or internet protocols, such as Universal Plug and Play (UPnP), Simple Object Access Protocol (SOAP), Transmission Control Protocol/Internet Protocol (TCP/IP), and Hyper Text Transfer Protocol (HTTP).

Figure 5B:
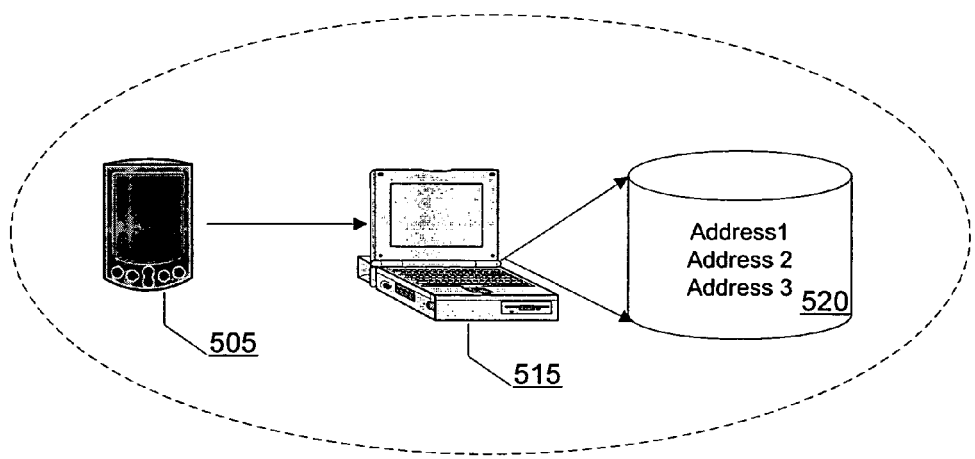

In block 420 of FIG. 4, the navigation system automatically receives a dataset from one or more mobile devices without manipulation of the source mobile device(s) and/or the navigation system. Referring to FIG. 5(b), in one embodiment, the navigation system 515 automatically receives a dataset without manual entry of the data into the navigation system. In another embodiment, the navigation system 515 receives the dataset in an expedited manner in response to a synchronization request by the mobile device 505. In another embodiment, the navigation system 515 sends a request to the mobile device 505 for the dataset.

The navigation system 515 may maintain the dataset through a directory service. The dataset may be stored on the navigation system storage area 520 and may be updated or appended with new data. The dataset may include any user data which is required by a navigation system, for example, personal information, including contact names, phone numbers, appointments, pictures, addresses, preferences, and the like.

In block 430, the navigation system may process the dataset in accordance with navigation system processing operations. In one embodiment, the navigation system could be a wireless GPS navigation system, which automatically receives the dataset, and processes the dataset in accordance with GPS navigation system processing.

Figure 5C:
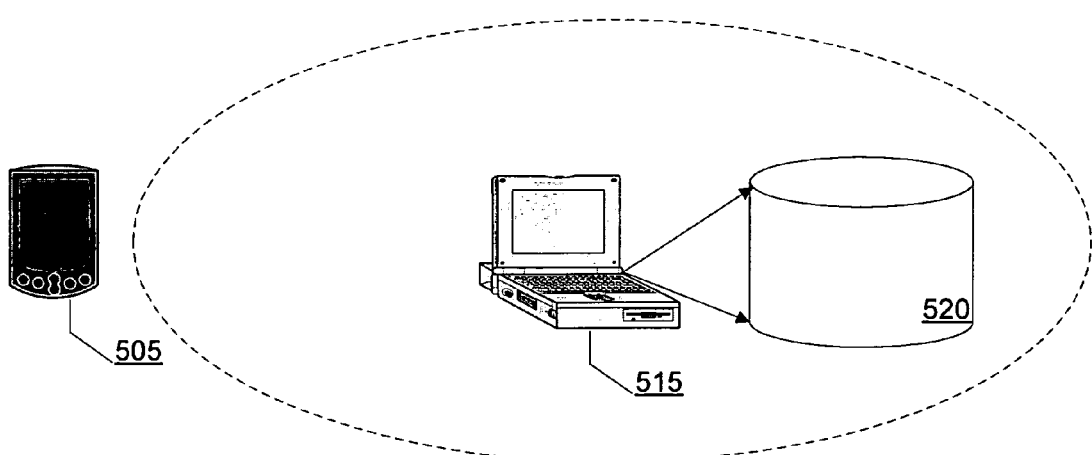

In one embodiment, the navigation system 515 may remove the dataset from the navigation system storage area 520 when the mobile device is no longer in wireless communication with the navigation system. As further illustrated in FIG. 5(c), in one embodiment, the user carrying the mobile device 505 on his or her person may exit the cabin of the vehicle, and may have moved beyond the predetermined distance. Accordingly, the navigation system 515 removes the received dataset from the storage area 520. In one embodiment, the removal of the dataset may occur automatically.

Alternatively, prior to data removal, the navigation system 515 may provide the option to delete the dataset from the navigation system storage area 520. The navigation system 515 may load the dataset into a more permanent storage area in response to a command to save the data. Alternatively, the navigation system 515 removes the dataset in response to a determination of data removal, such as a command to delete the information. In yet another embodiment, the navigation system 515 removes the received dataset in response to a directive to retain and remove the dataset at a specified time or for a specified amount of time.

Figure 6:
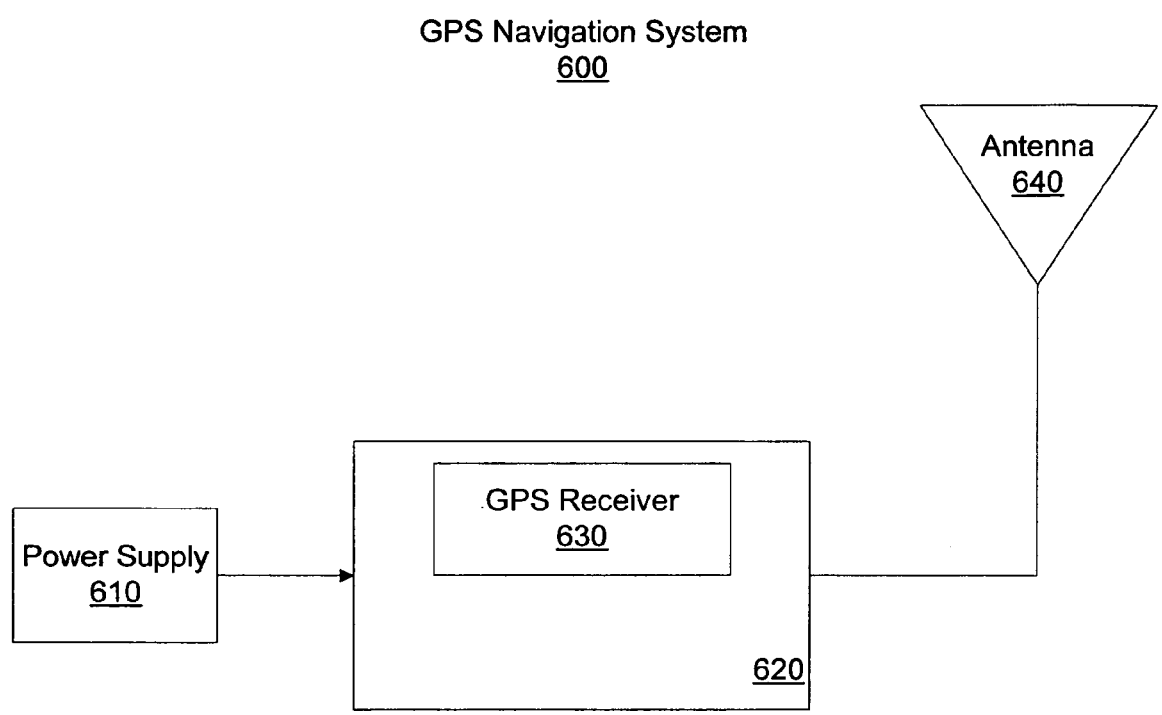
FIG. 6 is a block diagram illustrating a GPS navigation system to implement one embodiment of the present invention.

In one embodiment, a wireless navigation system may include a processor, storage area, and network interface. More specifically, FIG. 6 presents a block diagram illustrating a Global Positioning System (GPS) navigation system 600 to implement one embodiment of the present invention. Power supply 610 provides power to the navigation unit 620. A GPS antenna 640 receives GPS signals from GPS satellites (not shown) and inputs the signals to the GPS receiver 630. The navigation unit 620 may include a storage area, network interface, discovery module, dataset receiver, and navigation module. The navigation system performs vehicle navigation operations, such as accepting destination information from a user and displaying a calculated route from the current position to the destination.

The network interface may include a wireless communication interface, such as a BLUETOOTH transceiver, for communicating with the wireless interface of a mobile device. Alternatively, the network interface may comprise another type of RF transceiver such as wireless fidelity (Wi-Fi) 802.11. The discovery module, coupled to the wireless communication interface, may perform the function(s) of block 410 in FIG. 4. The dataset receiver may perform the function(s) of block 420. The navigation module may perform the function(s) of block 430.

The processes described above can be stored in the memory of the computer system or navigation system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

In the foregoing specification, the embodiments of the invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
    discovering the presence of at least one source mobile device and the presence of at least one target mobile device by a computer;
    automatically displaying, by the computer, a graphical interface to show a dataset from the at least one source mobile device; and
    initiating transmitting data between the at least one source mobile device and the at least one target mobile device by the computer.

2. The method of claim 1, wherein the displaying further comprises:
    automatically receiving the dataset, wherein the dataset is at least a representation of data on the at least one source mobile device, and wherein the representation is at least one of a subset of the data on the at least one source mobile device and a description of the data on the at least one source mobile device.

3. The method of claim 1, wherein the discovering the presence of the at least one source mobile device and the presence of the at least one target mobile device occurs responsive to the at least one source mobile device and the at least one target mobile device moving within a communication range of the computer.

4. The method of claim 1, further comprising:
    automatically removing the dataset from the computer responsive to the at least one source mobile device exiting a communication range of the computer.

5. The method of claim 1, wherein the initiating is in response to a command entered via an input device of the computer.

6. The method of claim 1, wherein the initiating comprises:
    transmitting a wireless request to the at least one source mobile device to transmit data to the at least one target mobile device.

7. The method of claim 1, wherein the initiating comprises:
    transmitting the dataset of the at least one source mobile device to the at least one target mobile device.

8. A machine readable medium that provides instructions that, if executed by a machine, will cause the machine to perform operations comprising:
    discovering the presence of at least one source mobile device and the presence of at least one target mobile device by a computer;
    automatically displaying, by the computer, a graphical interface to show a dataset from the at least one source mobile device; and
    initiating transmitting data between the at least one source mobile device and the at least one target mobile device by the computer.

9. The machine readable medium of claim 8, wherein the displaying further comprises:
    automatically receiving the dataset, wherein the dataset is at least a representation of data on the at least one source mobile device, and wherein the representation is at least one of a subset of the data on the at least one source mobile device and a description of the data on the at least one source mobile device.

10. The machine readable medium of claim 8, further comprising:
    automatically removing the dataset from the computer responsive to the at least one source mobile device exiting a communication range of the computer, wherein the discovering the presence of the at least one source mobile device and the presence of the at least one target mobile device occurred responsive to the at least one source mobile device and the at least one target mobile device moving within a communication range of the computer.

11. The machine readable medium of claim 8, wherein the initiating is in response to a command entered via an input device of the computer.

12. The machine readable medium of claim 8, wherein the initiating comprises:
    transmitting a wireless request to the at least one source mobile device to transmit data to the at least one target mobile device.

13. An apparatus, comprising:
    an input device;
    a wireless communication interface;
    a display;
    a discovery module commutatively coupled to the wireless communication interface to discover the presence of at least one source mobile device and at least one target mobile device;
    a display module commutatively coupled to the discovery module and to the display to automatically display a graphical interface to show a dataset from the at least one source mobile device; and
    an inter-device communication module coupled to the input device and the display module to initiate transmitting data between the at least one source mobile device and the at least one target mobile device.

14. The apparatus of claim 13, wherein the display module further comprises:
    a receiver module to automatically receive the dataset, wherein the dataset is at least a representation of data on the at least one source mobile device, and wherein the representation is at least one of a subset of the data on the at least one source mobile device and a description of the data on the at least one source mobile device.

15. The apparatus of claim 13, wherein the inter-device communication module initiates the transmitting responsive to a command entered via the input device without further input required at the at least one source mobile device and the at least one target mobile device.

16. A system, comprising:
    a source mobile device and a target mobile device, wherein the source mobile device is one of a personal server, a cell phone, a portable computer, and a personal digital assistant; and
    a computer comprising,
    an input device,
    a wireless communication interface,
    a display, a discovery module commutatively coupled to the wireless communication interface to discover the presence of the source mobile device and the target mobile device, a display module commutatively coupled to the discovery module and to the display to automatically display a graphical interface to show a dataset from the source mobile device, and an inter-device communication module coupled to the input device and the display module to initiate transmitting data between the source mobile device and the target mobile device.

17. The system of claim 16, wherein the display module further comprises:

a receiver module to automatically receive the dataset, wherein the dataset is at least a representation of data on the source mobile device, and wherein the representation is at least one of a subset of the data on the source mobile device and a description of the data on the source mobile device.

18. The system of claim 16, wherein the inter-device communication module initiates the transmitting responsive to a command entered via the input device without further input required at the source mobile device and the target mobile device.

* * * * *